(12) United States Patent
Levasseur et al.

(10) Patent No.: US 8,486,309 B2
(45) Date of Patent: Jul. 16, 2013

(54) NEGATIVE ELECTRODE MATERIAL FOR LI-ION BATTERIES

(75) Inventors: Stéphane Levasseur, Brussels (BE); Cécile Tessier, Bruges (FR); Josette Olivier-Fourcade, Jacou (FR); Laure Monconduit, Jacou (FR); Costana Ionica-Bousquet, Montpellier (FR); Claire Villevieille, Marguerittes (FR); Michèle Van Thournout, Lier (BE)

(73) Assignees: Umicore, Brussels (BE); Centre National de la Recherche Scientifique, Paris (FR); Saft Groupe S.A., Bagnolet (FR); Universite Montpellier 2, Montpellier (FR)

( * ) Notice: Subject to any disclaimer, the term of this patent is extended or adjusted under 35 U.S.C. 154(b) by 289 days.

(21) Appl. No.: 12/746,319

(22) PCT Filed: Nov. 19, 2008

(86) PCT No.: PCT/EP2008/009763
§ 371 (c)(1),
(2), (4) Date: Nov. 11, 2010

(87) PCT Pub. No.: WO2009/074208
PCT Pub. Date: Jun. 18, 2009

(65) Prior Publication Data
US 2011/0042628 A1    Feb. 24, 2011

Related U.S. Application Data

(60) Provisional application No. 61/006,330, filed on Jan. 7, 2008.

(30) Foreign Application Priority Data

Dec. 10, 2007 (EP) .................................. 07291475

(51) Int. Cl.
*H01B 1/02* (2006.01)
*H01M 4/88* (2006.01)

(52) U.S. Cl.
USPC ..................................... 252/518.1; 252/182.1

(58) Field of Classification Search
USPC ........................... 252/502, 506, 518.1, 182.1
See application file for complete search history.

(56) References Cited

FOREIGN PATENT DOCUMENTS

| EP | 1623473 | | 2/2006 |
|---|---|---|---|
| WO | WO 03/030283 | * | 4/2003 |
| WO | WO 2004/100292 | * | 11/2004 |

OTHER PUBLICATIONS

International Search Report and Written Opinion, issued in PCT/EP2008/009763, dated Jul. 30, 2009.
International Preliminary Report on Patentability, issued in PCT/EP2008/009763, dated Jun. 15, 2010.

* cited by examiner

*Primary Examiner* — Mark Kopec
*Assistant Examiner* — William Young
(74) *Attorney, Agent, or Firm* — Brinks Hofer Gilson & Lione

(57) ABSTRACT

An active material for a lithium battery electrode comprises a phase having the formula $Li_{2+v-4c}C_cTi_{3-w}Fe_xM_yM'_zO_{7-\alpha}$, in which M and M' are metal ions of groups of 2 to 15 having an ionic radius between 0.5 and 0.8 Å in an octahedral environment, v, w, x, y, z and α being associated by the relationships: $2\alpha = -v+4w-3x-ny-n'z$, with n and n' being the respective formal degrees of oxidation of M and M'; $-0.5 \leq v \leq 0.5$; $y+z>0$; $x+y+z=w$; and $0<w\leq 0.3$; and wherein at least part of the lithium is substituted by carbon according to the relationship $0<c(2+v)/4$. The invention also includes a method for synthesizing the active material which comprises mixing and grinding the precursor compounds containing the metal components, carbon and oxygen; heating the mixture in an inert atmosphere at a temperature of 950 to 1050° C. in order to make a ceramic phase; and rapidly cooling the ceramic phase to produce the active material.

11 Claims, 4 Drawing Sheets

(b)

(a)

NEGATIVE ELECTRODE MATERIAL FOR LI-ION BATTERIES

This application is a national stage application of International Application No. PCT/EP2008/009763, filed Nov. 19, 2008, which claims priority to European Patent Application No. 07291475.7, filed Dec. 10, 2007, and U.S. Provisional Patent Application No. 61/006,330, filed Jan. 7, 2008, the entire contents of which are hereby incorporated by reference.

The present invention relates to lithium cells, accumulators or batteries, and more particularly an active material for the negative electrode of rechargeable batteries.

Batteries of Li-ion type are designed for new applications (portable electronics, cableless tools, hybrid vehicles) which require still more power and energy in order to respond to requirements. They should be stable over their life span while cycling and over long periods of time. Finally, they should respond to society's requirements associated with safety and protection of the environment.

Graphite is commonly used as the negative electrode for Li-ion batteries. It is considered however that lithium titanate oxide (ramsdellite, $Li_2Ti_3O_7$) is a promising material, by virtue of its electrochemical performance associated with its low production cost and its non-toxicity. Such a negative electrode material functions at a higher voltage than that of carbon (>1V), ensuring in this way better functioning security. Moreover it is less subject to polarization, that is to say the potential difference between charge and discharge, than graphite and thus lends itself to a use requiring high power. The capacity of this material is however relatively low, reaching approximately 130 Ah/kg on a low regime (C/15) and 100 Ah/kg on a high regime (1 C) but has the advantage of having excellent reversibility during rapid regime cycling.

The capacity and current density of this $Li_2Ti_3O_7$ have been first of all improved by substituting part of the $Ti^{4+}$ by $Fe^{3+}$. Then, and according to the teaching of EP-1 623 473, the reversible capacity at a low regime may now reach 140 Ah/kg, by virtue of a supplementary substitution by one or more of the following elements: $Ti^{3+}$, $Co^{2+}$, $Co^{3+}$, $Ni^{2+}$, $Ni^{3+}$, $Cu^{2+}$, $Mg^{2+}$, $Al^{3+}$, $In^{3+}$, $Sn^{4+}$, $Sb^{3+}$, $Sb^{5+}$. These substitutions also make it possible to reduce the synthesis temperature, which reduces production costs.

The present invention proposes above all to improve a substituted ramsdellite, so as to obtain improved specific capacity, while preserving the other properties of the existing poly-substituted product.

The present invention relates more precisely to a negative electrode material that responds to the aforementioned requirements.

The invention relates to an active material for a lithium battery electrode, comprising a phase having a general formula $Li_{2+v-4c}C_cTi_{3-w}Fe_xM_yM'_zO_{7-\alpha}$, in which M and M' are metal ions of groups of 2 to 15 having an ionic radius between 0.5 and 0.8 Å in an octahedral oxygen environment, v, w, x, y, z and α being associated by the relationships:
$2\alpha = -v + 4w - 3x - ny - n'z$, guaranteeing electroneutrality, with n and n' the respective formal degrees of oxidation of M and M'; $-0.5 \leq v \leq +0.5$; $y+z \geq 0$; $x+y+z=w$; and $0<w \leq 0.3$; characterized in that at least part of the lithium is substituted by carbon according to the relationship $0<c \leq (2+v)/4$.

The M and M' ions may be selected from the list composed of $Ti^{3+}$, $CO^{2+}$, $CO^{3+}$, $Ni^{2+}$, $Ni^{3+}Cu^{2+}$, $Mg^{2+}$, $Al^{3+}$, $In^{3+}$, $Sn^{4+}$, $Sb^{3+}$, et $Sb^{5+}$. M is preferably $Ni^{2+}$ and M' $Al^{3+}$.

The best results are obtained with $x \leq 0.1$; $y \leq 0.2$; and $z \leq 0.1$. Moreover, it is useful to choose x:y:z ratios within a range 1:3.9 to 4.1:0.90 to 1.10. It is more recommended to comply with $c \geq 0.1$, preferably $c \geq 0.2$.

Another object of the invention relates to a method for synthesizing the active material defined above, and comprises the steps of:
 reactive mixing and grinding of precursor compounds containing the elements Li, Ti, Fe, C, O, M and M';
 synthesis of the ceramic phase by heating the mixture in an inert atmosphere at a temperature of 950 to 1050° C.;
 rapid cooling of the ceramic phase.

It is self-evident that a person skilled in the art will be able to define the suitable quantities of the various reactants, so that the synthesized product corresponds to the general formula of the desired phase, as defined above.

During this process it is useful for cooling of the ceramic phase to be carried out at least 100° C./min, from the synthesis temperature up to no more than 400° C.

The invention also relates to the use of the active material defined above for the manufacture of lithium cells, accumulators or batteries.

The invention finally relates to lithium cells, accumulators or batteries containing the active material defined above.

The material of the invention has mass and volume capacities that may reach 190 Ah/kg, or 602 Ah/m³, that is to say greater than those of the prior art, while preserving the previously acquired advantages, notably:
 a small loss of capacity at the first cycle, of 2 to 10 Ah/kg;
 excellent cyclability;
 low polarization of 30 to 70 mV in C/15 régime.

The ramsdellite structure consists of a network comprising Ti and Li ions in an octahedral oxygen environment and channels partly occupied by Li atoms in a tetrahedral environment. This arrangement leaves a large number of vacant tetrahedral sites in the channels and the Li/voids distribution may vary according to the synthesis conditions. Substitution metals occupy the octahedral sites of the network.

It is demonstrated here that carbon may be partially or totally substituted for lithium to lead to the formation of a modified ramsdellite, low in lithium. A certain number of insertion sites represented by the conventional notation $\square_{2+w-v-(x+y+z)+3c}$ correspond with the general formula $Li_{2+v-4c}C_cTi_{3-w}Fe_xM_yM'_zO_{7-\alpha}$. This modification favors the occupation of these sites, and on account of this improves the capacity of the original material. It is not however excluded for the synthesized material to be a composite, in particular for high values of the parameter c. The synthesized material therefore comprises a carbonaceous ramsdellite phase low in Li, and as the case may be also a non-carbonaceous ramsdellite enriched with Li.

It should be noted that it is tetrahedral lithium that is substituted by carbon, constituting a $CO_3^{2-}$ group while being placed in the plane of 3 oxygens, the number of voids then being dependent on the values of v, x, y, z and c in the general formula above. For limiting values of substitutions of Li by C, the phase is emptied of structural lithium. It should be noted that any excess carbon will be deposited preferably at the grain boundaries and could improve the conductivity of the material.

The first step of the method according to the invention comprises a reactive mixture of compounds.

Solid precursors in the form of a fine powder are selected and mixed. This mixture preferably comprises the oxides of Ti and Fe, as well as those of the metals M and M'. Other precursors are equally suitable, it being possible for these to be organic and/or inorganic compounds capable of forming Me—O—Me bonds (where Me is a metal) by condensation or hydrolysis/condensation. Reference may be made, as an example, of oxides, carbonates, acetates, hydroxides, chlorides (e.g. $AlCl_3$), nitrates, Me-oxoalkoxides, this not being exhaustive and a person skilled in the art will know how to complete this. As regards lithium, this may be provided by another precursor, such as an oxide, hydroxide or chloride. $Li_2CO_3$ is however preferred.

The mixture will also include carbon or precursors of carbon that will be the most simple carbohydrate-containing phases, such as saccharides or derivatives of saccharides, for example glucose, fructose, sucrose, ascorbic acid, and polysaccharides corresponding to the condensation of saccharides, such as starch, cellulose and glycogen.

The proportion of each of the metals in the mixture of precursors corresponds to the stoichiometric proportion of the material in question, leading to the formation of the composite. The proportion of carbon will be calculated taking account of losses of CO and $CO_2$ by oxidation. This proportion it may be increased if an excess of carbon is desired at the grain boundaries.

The second step of the method according to the invention comprises heat treatment.

According to the invention, heat treatment is carried out in a controlled atmosphere (e.g. $N_2$, Ar). It is carried out at a temperature that may lie between 980° C. and 1050° C., preferably between 1 h 30 and 2 h in order to obtain good crystallinity, connected with a limited particle size. The temperature rise to reach the reaction plateau may be carried out in a single rapid step since it makes it possible to minimize secondary reactions and the formation of undesirable titanates.

The last step consists of rapidly cooling the material.

The manufacturing process in its entirety is rapid and has reduced operating costs.

COMPARATIVE EXAMPLE 1

Example 1 concerns a ramsdellite $Li_2Ti_3O_7$ substituted by three elements Fe, Ni, Al, without carbon according to the general formula $Li_{2+v-4c}C_cTi_{3-w}Fe_xNi_yAl_zO_{7-\alpha}$, where $c=0$; $v=-0.14$; $w=0.15$; $x=0.025$; $y=0.1$; and $z=0.025$. Reactive grinding of the compounds $Li_2CO_3$ (0.7235 g), anatase $TiO_2$ with a nanometric size (1.2028 g), $Fe_2O_3$ (0.021 g), NiO (0.0393 g) and finally $Al_2O_3$ (0.0134 g) was carried out in a Pulvérisette® 7 (duration 15 min; speed 8) with agate balls and a ratio of the weight of balls/weight of product equal to 10. Heat treatment was carried out in a boat under Ar in a single step. A ramp of 7° C./min was applied up to the synthesis temperature of 980° C., this temperature being maintained for 1 h 30. Cooling was carried out rapidly in argon so as to set the high temperature structure.

EXAMPLES 2 to 4

Examples 2 to 4 concern a ramsdellite $Li_2Ti_3O_7$ substituted by three elements, Fe, Ni, Al, and by carbon, according to the general formula $Li_{2+v-4c}C_cTi_{3-w}Fe_xNi_yAl_zO_{7-\alpha}$, where $v=-0.14$; $w=0.15$; $x=0.025$; $y=0.1$ and $z=0.025$ and $0.1 \leq c \leq 0.465$. Sucrose was added as a carbon precursor, representing 5, 10 and 15 weight % based on the total weight weighed before synthesis. Refer to table 1 for the various carbon levels. Reactive grinding of the compounds $Li_2CO_3$, anatase $TiO_2$ of nanometric size, $Fe_2O_3$, NiO, $Al_2O_3$ in stoichiometric quantities, was carried out in a Pulvérisette® 7 (duration 15 min; speed 8) with agate balls and a ratio of the weight of balls/weight of product equal to 10. Heat treatment was carried out as in example 1.

TABLE 1

Summary of carbon levels in examples 1 to 4

| | Sucrose (%) before synthesis | Total C (%) after synthesis | Total C (mole/mole) after synthesis | Substituted C (parameter c) after synthesis |
|---|---|---|---|---|
| Example 1 (*) | 0 | 0 | 0 | 0 |
| Example 2 | 5 | 0.63 | 0.14 | 0.14 |
| Example 3 | 10 | 1.25 | 0.27 | 0.27 |
| Example 4 | 15 | 2.95 | 0.68 | 0.465 |

(*) Comparative

Figure 1:
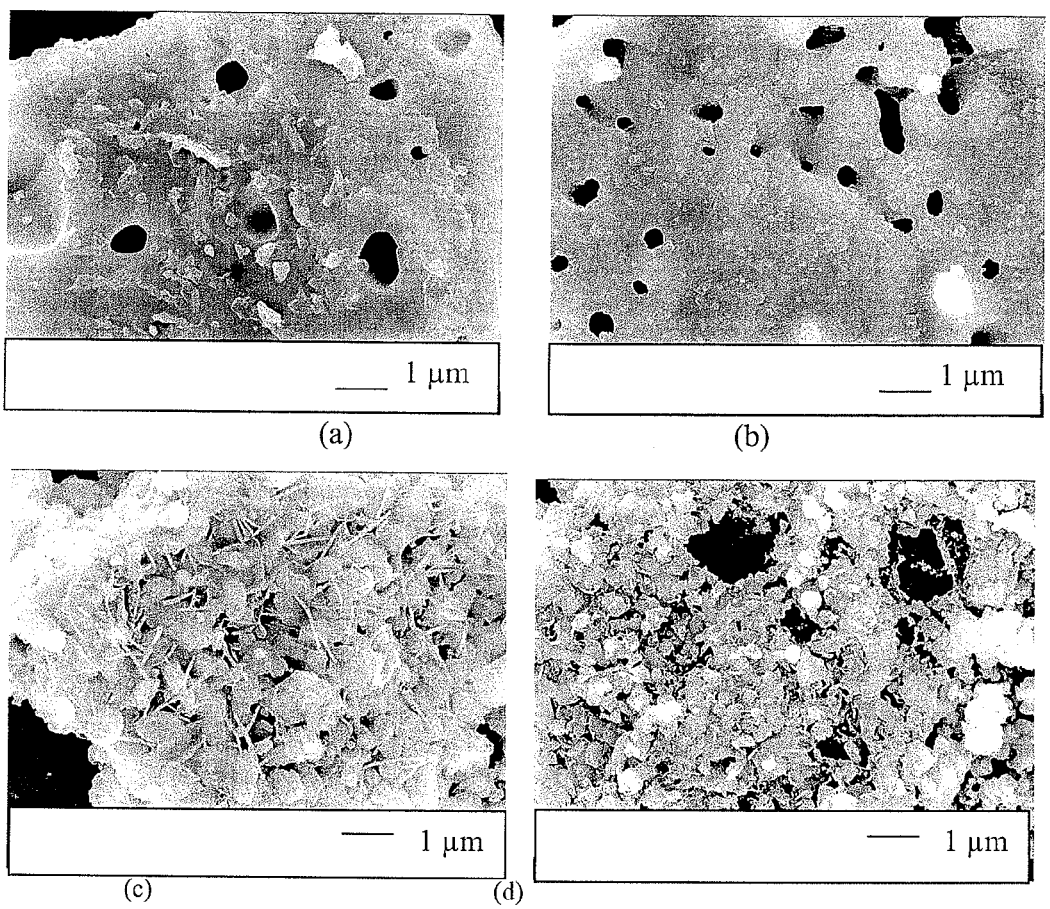
FIG. 1: Scanning electron photomicrographs of the material $Li_2Ti_3O_7$ substituted with Fe, Ni, Al without carbon (a) and with various carbon contents from 0.14 (b), 0.27 (c) and 0.68 (d) mole per mole of synthesized material.

FIG. 1 shows scanning electron photomicrographs of various synthesized examples. The base material without carbon according to example 1 shows (a) aggregates 10-20 μm in diameter with a porous texture. By substituting the ramsdellite phase with various carbon levels according to examples 2 to 4, a change in morphology and texture was observed (b-d) creating an agglomerate of particles and filaments. With 0.68 mole of carbon, according to example 4, the remainder of carbon (d) appears at the grain boundaries resulting in an excess of this element during synthesis. It should be noted in point of fact that the maximum carbon that can be inserted in the ramsdellite structure for $v=-0.14$ is 0.465 mole/mole, that is a value for the parameter c of 0.465.

Figure 2:
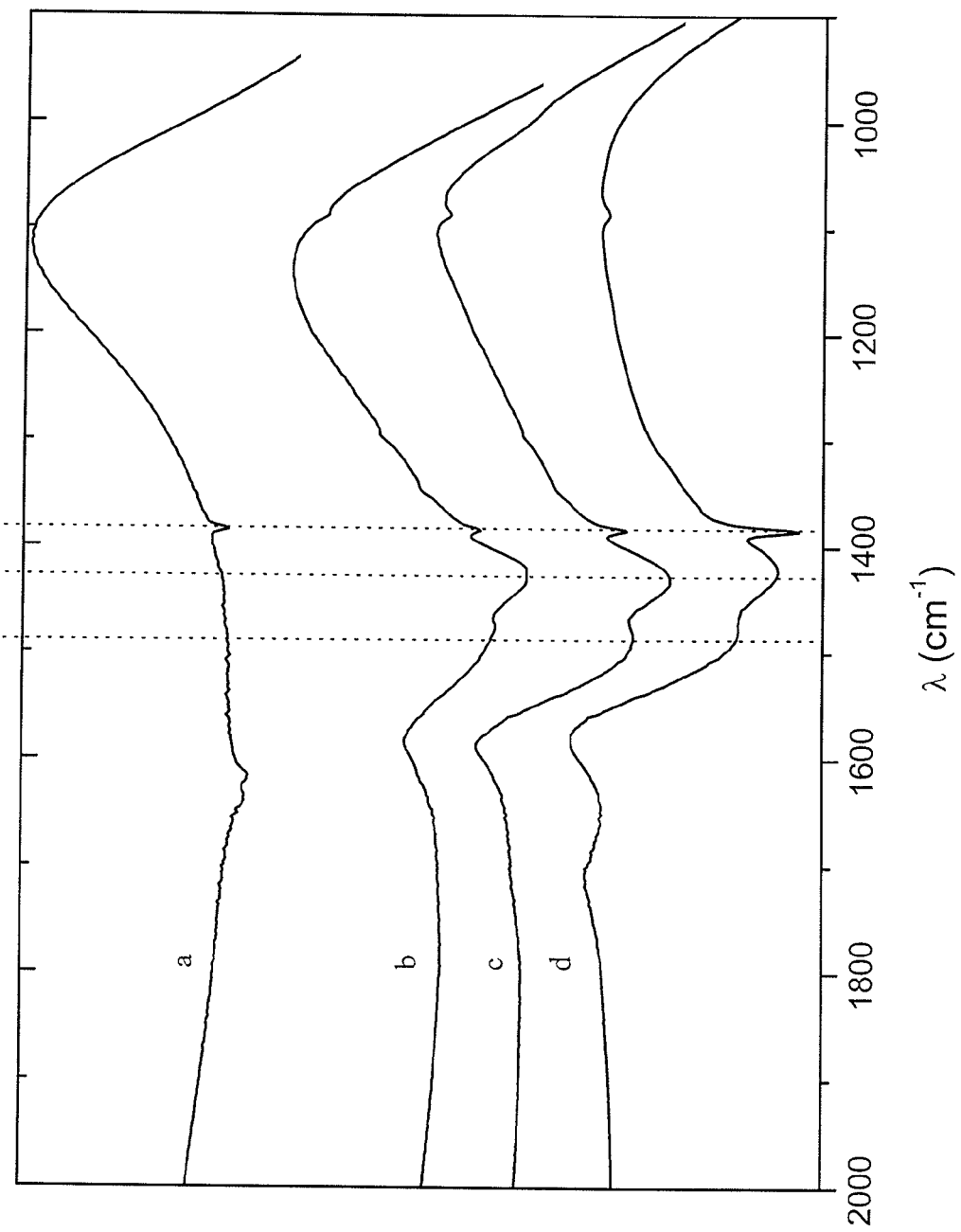
FIG. 2: Comparison of infrared spectroscopy bands between various materials substituted with Fe, Ni, Al synthesized without carbon (a) with various carbon contents, from 0.14 (b), 0.27 (c) and 0.68 (d) mole per mole of material synthesized.

The IR spectra of FIG. 2 show (b-d), for products prepared according to examples 2 to 4, the presence of vibration bands between 1430 and 1500 $cm^{-1}$ characteristic of the group $CO_3^{2-}$. This confirms substitution of carbon in the ramsdellite structure. The product prepared according to example 4 also shows (d) vibration bands towards 1650 $cm^{-1}$. These correspond to conjugated C—C bands that belong to surface carbon.

Electrochemical tests were carried out in a half cell with two electrodes of which the negative was a metallic lithium washer. The positive comprised a mixture of 85% by weight of active material, 5% by weight of carbon black, and 10% by weight of PTFE binder. The electrolyte used was $LiPF_6$ (1 M) in ethylene carbonate, dimethyl carbonate and propylene carbonate (1:3:1). Cycling was carried out in galvanostatic mode at 25° C. between 1 and 2.5 V vs $Li/Li^+$ at C/15 and 1 C regimes.

Figure 3:
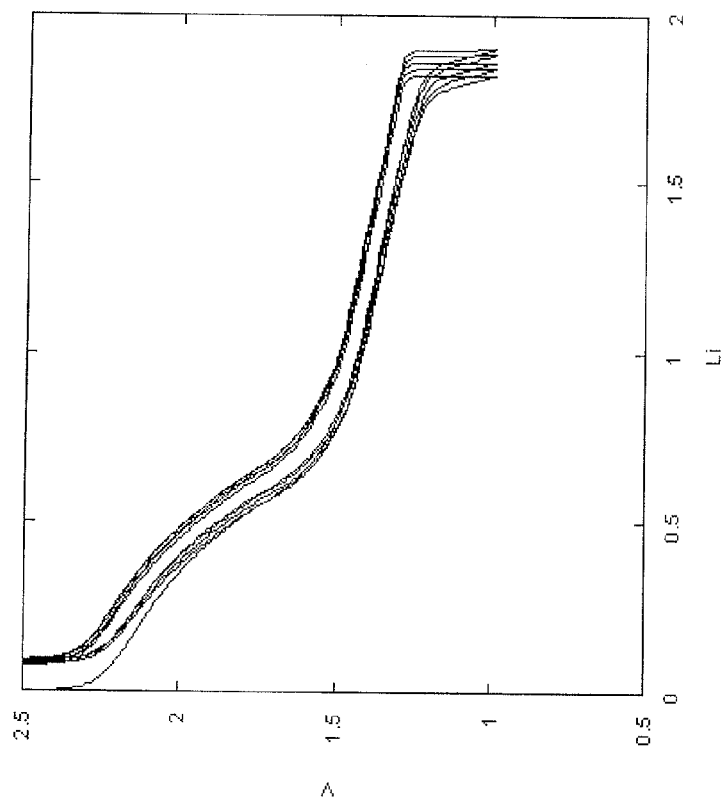
FIG. 3: Charge/discharge galvanostatic curves in C/15 regime of the material $Li_2Ti_3O_7$ substituted with Fe, Ni, Al without carbon (a) and with 0.27 (b) mole of carbon per mole of synthesized material.
Figure 3:
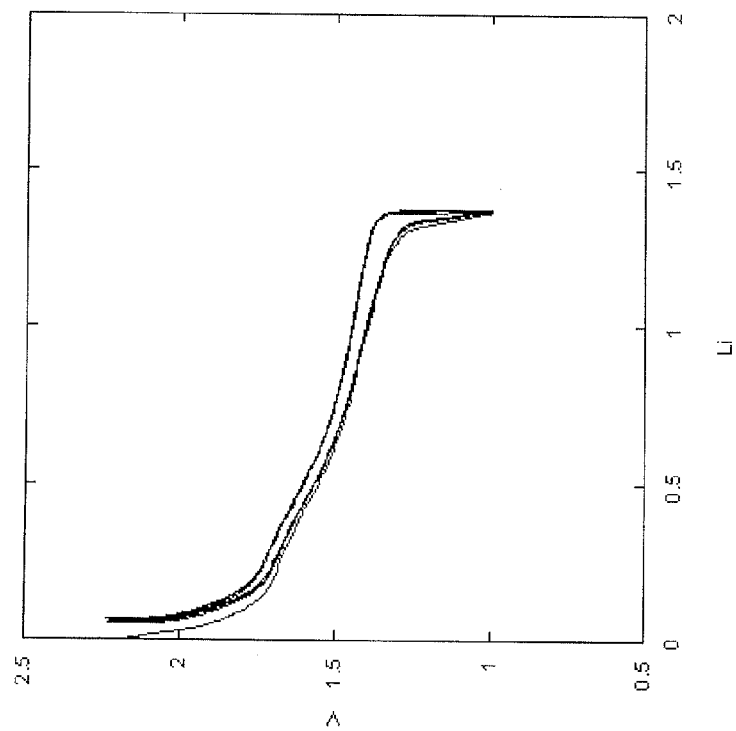

FIG. 3 (a) shows charge and discharge curves (vs. Li) of the material without carbon, prepared according to example 1. FIG. 3 (b) corresponds to the material with carbon, according to example 3. These measurements were carried out in galvanostatic mode at a regime of C/15 between 1 and 2.5 V vs Li/Li$^+$. The capacity observed for the material without carbon was 130 Ah/kg. In FIG. 3 (b), the curve shows a shoulder between 1.4 and 2.4 V. By virtue of the carbon, the values of the reversible capacities were improved, reaching here 180 Ah/kg with a low irreversible capacity of 8 Ah/kg, and a low polarization of 67 mV.

Figure 4:
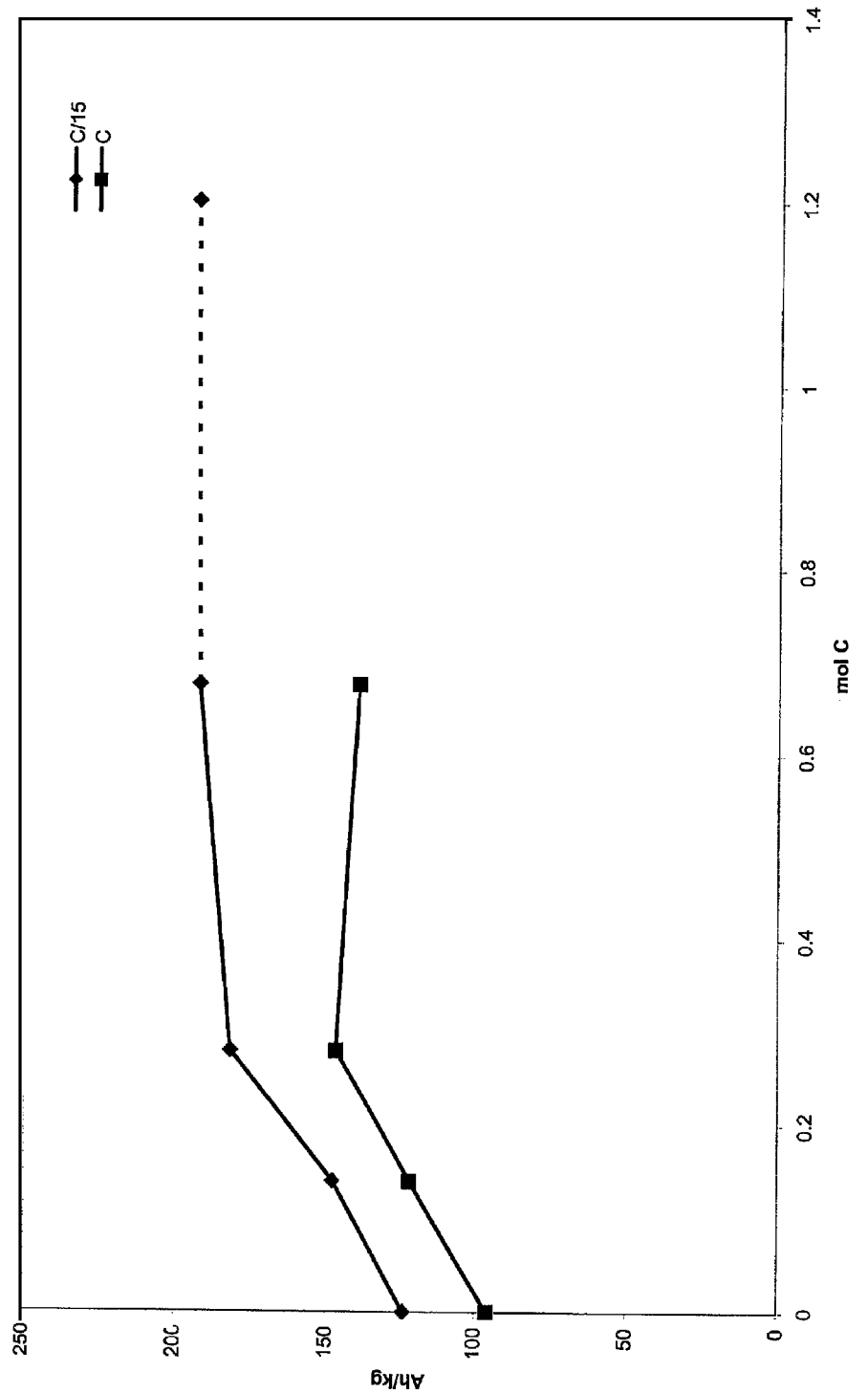
FIG. 4: Specific capacities, in Ah/kg of active material as a function of the quantity of carbon, in mole per mole of synthesized material, with C/15 and 1C regimes.

In FIG. 4, the values of specific capacities for the products prepared according to examples 1 and 4 are shown as a function of the quantity of carbon measured in the ramsdellite phase. With the two regimes, C/15 and C, the specific capacities increased with the presence of carbon. The capacity was no longer improved beyond the saturation point (c=0.465, beyond which excess carbon was found on the surface of the material.

The invention claimed is:

1. An active material for a lithium battery electrode, comprising a phase having a general formula $Li_{2+v-4c}C_cTi_{3-w}Fe_xM_yM'_zO_{7-\alpha}$, in which M and M' are metal ions of groups of 2 to 15 having an ionic radius between 0.5 and 0.8 Å in an octahedral oxygen environment, v, w, x, y, z and a being associated by the relationships:

$2\alpha=-v+4w-3x-ny-n'z$, with n and n' being the respective formal degrees of oxidation of M and M';

$-0.5 \leq v \leq +0.5$; $-y+z>0$;

$x+y+z=w$; and $0<w\leq 0.3$;

wherein at least part of the lithium is substituted by carbon according to the relationship $0<c\leq(2+v)/4$.

2. The active material of claim 1, wherein M and M' are selected from the group consisting of: $Ti^{3+}$, $Co^{2+}$, $Co^{3+}$, $Ni^{2+}$, $Ni^{3+}Cu^{2+}$, $Mg^{2+}$, $Al^{3+}$, $In^{3+}$, $Sn^{4+}$, $Sb^{3+}$ and $Sb^{5+}$.

3. The active material of claim 1, wherein M is $Ni^{2+}$ and M' is $Al^{3+}$.

4. The active material of claim 1, wherein $x \leq 0.1$;

$y \leq 0.2$; and $z \leq 0.1$.

5. The active material of claim 1, wherein the ratios x:y:z lie within a range of 1:3.9-4.1:0.90-1.10.

6. The active material of claim 1, wherein c>0.1.

7. The active material of claim 1, further comprising a phase substantially consisting of carbon.

8. A method for synthesizing the active material of claim 1, comprising:
   reactive mixing and grinding of precursor compounds containing the elements Li, Ti, Fe, C, 0, M and M' to form a mixture;
   heating the mixture in an inert atmosphere at a temperature of 950 to 1050° C. to synthesize a ceramic phase; and
   rapidly cooling the ceramic phase to synthesize the synthetic-active material.

9. The method of claim 8, wherein cooling the ceramic phase is carried out at at least 100° C./min, from the synthesis temperature down to no more than 400° C.

10. A lithium cell, accumulator or battery containing the active material of claim 1.

11. The active material of claim 6, wherein $c \geq 0.2$.

* * * * *

UNITED STATES PATENT AND TRADEMARK OFFICE
CERTIFICATE OF CORRECTION

PATENT NO. : 8,486,309 B2
APPLICATION NO. : 12/746319
DATED : July 16, 2013
INVENTOR(S) : Levasseur et al.

It is certified that error appears in the above-identified patent and that said Letters Patent is hereby corrected as shown below:

On the title page, item (57) Abstract, line 10, replace "$0<c(2+v)/4$" with --$0<c\leq(2+v)/4$--.

Signed and Sealed this
First Day of October, 2013

Teresa Stanek Rea
*Deputy Director of the United States Patent and Trademark Office*